Dec. 15, 1931.  R. P. PEAKE  1,836,987

BALL AND SOCKET UNIVERSAL JOINT

Filed Feb. 24, 1930

INVENTOR
Royal P. Peake
BY
ATTORNEYS

Patented Dec. 15, 1931

1,836,987

UNITED STATES PATENT OFFICE

ROYAL P. PEAKE, OF DETROIT, MICHIGAN

BALL AND SOCKET UNIVERSAL JOINT

Application filed February 24, 1930. Serial No. 430,560.

This invention relates to universal joints more especially for the propeller shafts for automotive vehicles.

The objects of the invention are:

First, to provide such a structure in which the alignment of the parts will be effectively maintained and which will be simple and very readily manufactured.

Second, to provide an improved ball member with jaws having radially disposed engaging driving fingers.

Third, to provide an improved construction of trunnion for the socket member.

Objects pertaining to general economies of construction and operation will appear from the detailed description to follow.

A preferred embodiment of my invention is illustrated in the accompanying drawings, in which.

Figure 1:
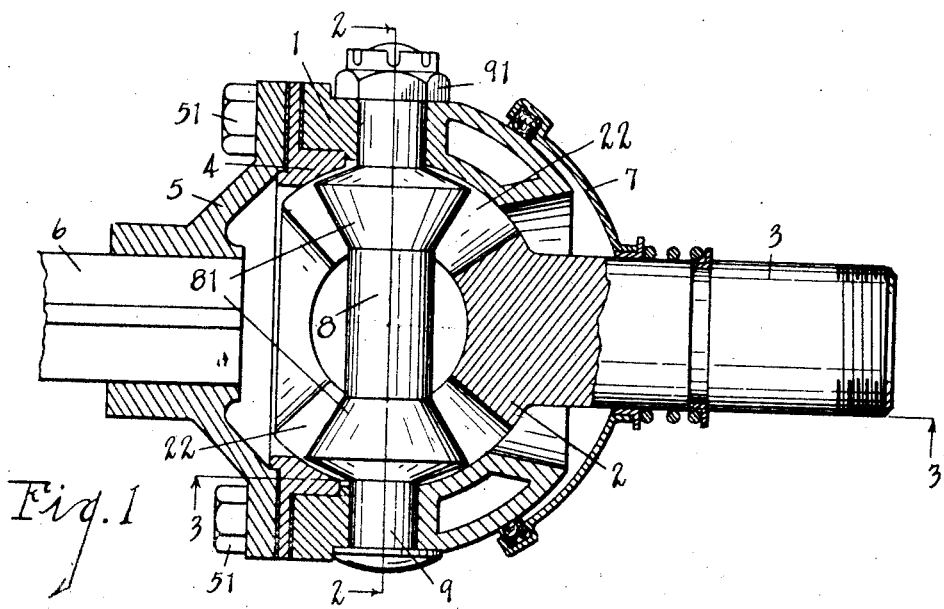
Fig. 1 is a detail sectional elevation on the section line 1—1 of Figs. 2 and 3, the parts being shown in full lines to make the same more clear.
Figure 3:
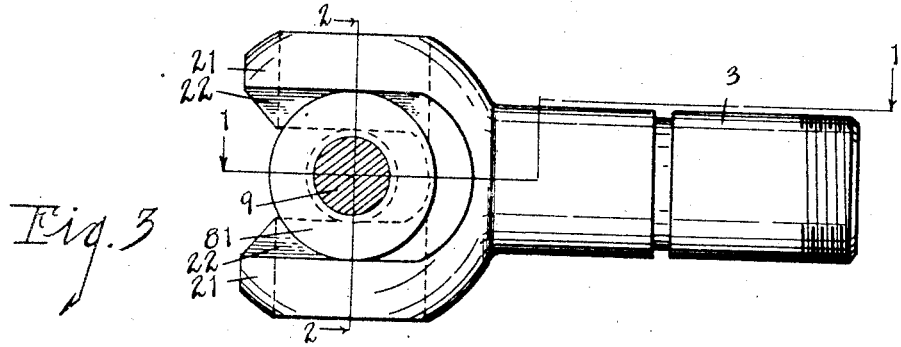
Fig. 3 is a detail elevation view of the ball member, its jaws and the engaging trunnion, taken on section line 3—3 of Fig. 1, the ball member and its shaft being shown in full lines.
Figure 2:
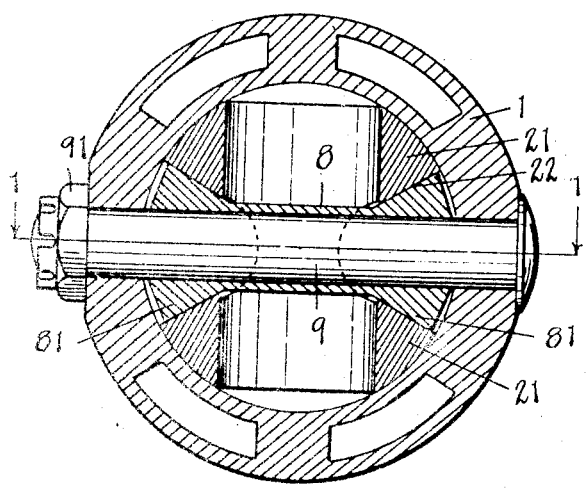
Fig. 2 is a detail transverse sectional elevation on line 2—2 of Figs. 1 and 3.
Figure 4:
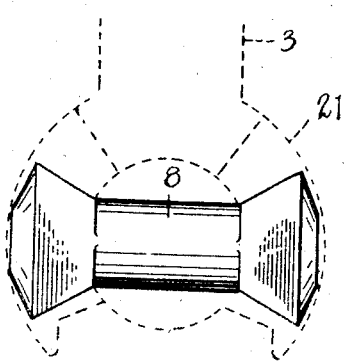
Fig. 4 is a detail elevation view of a modified form of the trunnion having pyramidal heads which enhance the bearing surface, the position of the ball and jaw members being indicated by dotted lines.

The parts will be identified by their numerals of reference which are the same in all the views.

The structure is essentially a ball and socket universal joint. 1 is the socket, 2 is the ball member disposed within the same and having a shaft shank 3. 4 is the bearing ring secured to the socket member to retain the ball member in place. 5 is the cap over the ball member carrying a shaft 6 which is aligned thereto and is retained in place by the cap screws 51.

7 is the usual dust guard carried by the shaft 3 and engaging a spherical surface on the exterior of the socket. 8 is the trunnion member which is secured in place by the screw bolt 9 through the socket member, the same being provided with castellated nut 91 or other suitable attaching means.

The trunnion member 8 is provided with conical heads 81, the surfaces of which are true segments of a cone which if, extended, would meet at the center of the ball and socket joint, thus making the surfaces radial.

The ball member is divided into jaws 21, 21 which have beveled faces 22 adapted to engage the conical surfaces of the heads 81.

From this description it will be seen that the ball and socket members may have a very close fit and that the engaging jaws of the ball member have beveled faces to correspond to a conical surface formed by conical segments at the heads of the trunnion. It will be observed that the trunnion will tend to center itself under the stresses when the joint is in operation. It does not matter which is the driven member, the shaft 3 or the shaft 6.

I have shown my invention in its simplest form. It might be provided with adjustments, particularly as to the trunnion member, but the surfaces are so broad and so effective and the parts tend to center, so that such adjustments are hardly necesary.

It will be observed that the structure is an improvement in important details of the structures appearing in Patent No. 1,181,625 issued May 2, 1916 to F. G. Walker for universal joint and Patent No, 1,221,638, issued April 3, 1917, to Frederick G. Walker for universal joint.

I desire to claim the invention in its specific form and also broadly as pointed out in the appended claims.

Having thus described by invention what I claim as new and desire to secure by Letters Patent is:

1. In a ball and socket universal joint, the combination of a socket member with a narrow opening at one side and a full opening at the opposite side, a retainer bearing ring, a cap with shaft connection retaining the said bearing ring by suitable cap screw, a ball member divided into pairs of jaws by a slot the sides of which are cut at an angle radial to the said ball, a trunnion member within the said socket member having a cylindrical central portion and flaring outer heads conical in form of such form and dimension that if the cones were extended they would meet at the center of the ball, and a through bolt journaled through said trunnion and extended through the said socket with suitable means of retaining the same in place.

2. In a ball and socket universal joint, the combination of a socket member, a ball member divided into jaws, the surfaces of which are cut on lines that are radial to the ball of the said ball and socket joint, a trunnion member journaled on a cross pin in the said socket and having heads of conical form, the surface of which cones if extended will meet at the center of said ball.

In witness whereof I have hereunto set my hand.

ROYAL P. PEAKE.